Oct. 4, 1932.  A. McMURTRIE  1,880,352

GROUNDING CONNECTER

Filed May 5, 1928

INVENTOR
Adnah McMurtrie
BY
Bohleber & Ledbetter
ATTORNEYS

Patented Oct. 4, 1932

1,880,352

UNITED STATES PATENT OFFICE

ADNAH McMURTRIE, OF NEW YORK, N. Y., ASSIGNOR TO THE THOMAS & BETTS CO., OF ELIZABETH, NEW JERSEY, A CORPORATION OF NEW JERSEY

GROUNDING CONNECTER

Application filed May 5, 1928. Serial No. 275,270.

This invention relates to electrical connecting means and more particularly to a grounding connecter for use with wiring installations in buildings and the like in order to ground the conduit wiring system and thus eliminate fire hazards.

An object of the invention is to produce a grounding connecter which is convenient in use with outlet box and conduit or cable installations to establish positive electrical bond or connection between the box and conduit and to produce a very tight and non-loosening anchorage of the pipe in the knock-out hole of the electrical outlet box.

A further object is to produce a grounding connecter which can be installed either before or after the several wires in the box are connected and for this purpose the grounding device is so constructed that it may be slipped into position over a pipe without removing the locknut anchoring means which fasten the pipe in the box and without disconnecting any of the wires which run through the pipe into the box. In this way the device can be used in old house work to reestablish an electrical bond and ground connection between the pipe and box to recondition the pipe and wiring installations.

The accompanying drawing illustrates an example of the invention serving to show the principles involved and wherein:—

According to the principles of this invention, I provide wedge-shaped means which is forcibly moved by a screw to jam between the lock nut and box wall and to forcibly remove any possible looseness which may exist in the pipe and locknuts. It is ordinarily difficult for the workman on the job to so thoroughly tighten the lock nut or bushing nut that all lost motion is positively removed from the pipe and box connection. This is due to the fact that the space is limited in which the workman handles his tools, and because the box would likely be broken from its support on the lath or wall of the building if subjected to excessive nut turning strain. But my invention establishes a rigid connection between the pipe and box and what is more is the fact that the connection is an electrical one, i. e. the connection forms an electrical bond at the pipe and box juncture.

Figure 1:
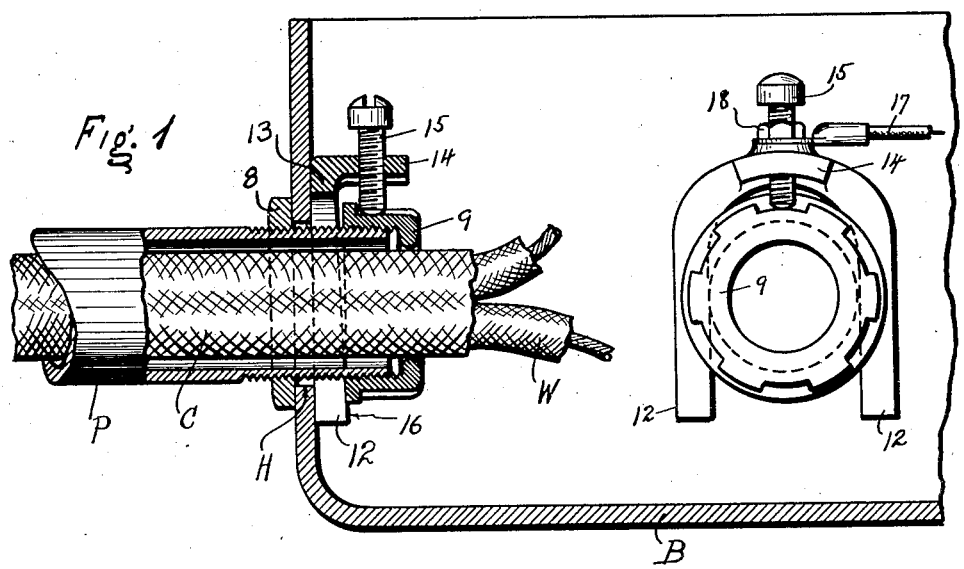
Figure 1 is a box assembly view in longitudinal section with the grounding connecters used in two separate places, one being shown in section and the other in front elevation.
Figure 2:
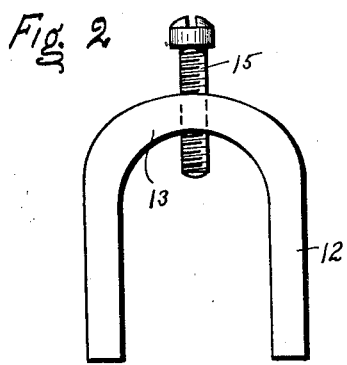
Figures 2 through 6 show respectively, a rear, side, front, top and bottom elevation of the yoke and wedge shaped grounding device.
Figure 3:
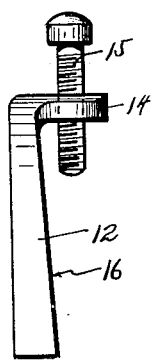
Figure 4:
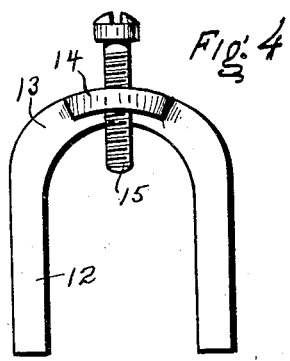
Figure 5:
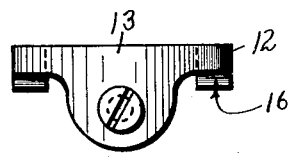
Figure 6:
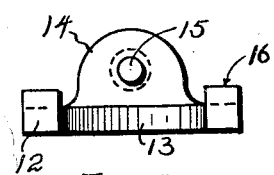

Electrical wiring fixture and outlet boxes B are made with knock-out openings or holes H to receive cable C and the electric wires W are frequently housed by conduit or pipe P and Figure 1 shows one typical form of box assembly wherein the electric wires W are led into the box through the pipe and are adapted to be connected with the lead wires running to lighting fixtures or other devices. The box and pipe connection should in reality be more positively connected electrically than is possible to attain with the nuts 8 and 9 ordinarily used and so I have provided a tightening and bonding means which works with the pipe anchoring nuts.

Various forms of anchorage means are used to fasten conduits in boxes, but the box assembly shown comprises one of the simplest methods wherein a lock nut 8 on the pipe abuts one side of the box and a bushing nut 9 is usually mounted on the inside of the box and screws against the box wall. This pipe and box connection is really not positive and certainly not as to an electrical bond which should exist between the box and pipe. In time the pipe becomes loose in the box. This loose condition may arise by reason of the pipes becoming rusty. On the other hand the nuts may not have been tightened in the first place. There is very little room within the walls of a building and on the inside of the box B in which a workman may tighten up the nuts 8 and 9 and the box is not fastened on the wall or ceiling in such a way as to stand too much strain and hence the nuts are none too well tightened. For these reasons the connection between the pipe and box may have been a relatively loose one in the beginning or will become so. In any event, it is found that looseness in the connection of the pipe and box is dangerous. If it transpires that an electrical ground connection shorts in some manner through the pipe and box, any imperfect bond at the point of joinder between the pipe and box affords opportunity of arcing at that point with consequent fire hazards.

My invention provides a simple grounding connecter which can be used either for old or new house work, i. e. it can be mounted and tightened up to recondition old work and remove the fire hazard, or it can be used in the first instance in new house work when the electrical box assembly is first installed. In either event, my invention includes operating means which is very easily actuated to take all of the slack out of the pipe and box connection after the nuts 8 and 9 are tightened.

One example of the structure illustrates the principles involved but it is understood that the U-shaped wedging device may be varied in form without departing from the invention. For example the device comprises a saddle-shaped part or a U-shaped member including wedging legs 12 carried on the base or body 13 of the member. An ear 14 is made substantially at right angles to the legs 12. This ear 14 carries any suitable form of operating means, for example a screw 15, which is threaded through the ear 14 and the screw 15 ordinarily extends substantially parallel to and centrally between the legs 12 and impinges or bears on some stationary part embraced within the grounding connecter and reacts from the stationary part to move or slide the legs.

The legs 12 are wedge-shaped and tapered, as indicated at 16, toward the upper end of the device and towards the screw. In this way the outer free ends of the legs are of maximum thickness and decrease towards the screw and hence the thinnest portion of the wedge is located proximate the screw. The spread of the U-part or the space within its legs preferably conforms to the size of the pipe on which it is mounted but in reality the connecter can be used with several different pipe sizes within a given range.

The grounding connecter is mounted astride the pipe P in the box B under the nut 9 between the latter and the inside box wall surface with the screw 15 pointing toward the open side of the box. The operating screw 15 is backed out of the ear 14 so as to permit the U-part to fit relatively far down onto the pipe whereupon the bushing nut 9 is tightened up against the grounding connecter. Having run the nuts 8 and 9 up as snugly as can be under the conditions which prevail, the workman now turns the screw 15 downwardly against the nut 9 which draws and slides the wedge-shaped legs 12 upwardly towards the top of the box between the box wall and the inner end of the tightened bushing nut. This relative sliding and frictional travel of the legs 12 against the box and against the inner end of the bushing nut 9 introduces a scraping action between the proximate surfaces of the box wall and grounding connecter and also between the proximate surfaces of the grounding connecter and bushing nut.

The scraping action described establishes a positive electrical bond and ground connection between the box and nut throughout the wedging legs 12, and added to this is the fact that the rotary motion of the screw 15 bearing on the bushing nut 9 likewise establishes a positive electrical connection at that point. Therefore, the electrical bond is perfected as between the pipe P and box B. What is of further importance is the fact that all lost motion is forced out of the box assembly in that the wedging force absolutely removes all relative motion however slight and which may be imperceptible at the time the box assembly is completed. It is not necessary for the mechanic to make the tedious effort of trying to tighten the nuts 8 and 9 since the operation of the screw means 15 serves to tighten them and the screw 15 is readily accessible.

The grounding connecter 12 can be installed for use at any time. It is of particular use in reconditioning old house work and in some localities laws require that this be done as by use of some form of pipe and box tightening and electrical bonding means to be installed. Either this must be done or all the old and condemned fittings must be torn out and new equipment put in. My invention enables the contractor to recondition old house work with minimum expense because the work can be done without so much as having to disconnect the wires W in the box. The nuts 8 and 9 are simply loosened and the rust, dirt and plaster is brushed out. One of the grounding connecters is then inserted and all the parts are retightened as hereinabove explained.

It is now evident that I have produced a grounding connecter and conduit tightener which has screw actuated operating means 15 which readily work with the screw anchorage means 8—9 of the conduit and box assembly. In fact both screw operating means 15 and 8—9 cooperate to anchor the conduit in the box more satisfactorily than is possible to accomplish by the use of the conduit nuts alone. While the conduit screw anchorage means 8—9 move longitudinally in relation to the pipe and these two nuts may simply be set up or turned to a snug position by hand, the screw 15 by reaction from the nut 9 enforces movement of the wedge legs 12 in a direction transversely of the pipe and acts to more positively tighten the nuts than could be accomplished by a wrench. The reaction of the screw 15 from some stationary member of the box assembly, such as the nut 9, actuates the wedging means included in the tapering surface 16 and thereby slides the wedging means into a tightened position.

In some cases it is required that a separate ground wire be attached to the grounding connecter and for this purpose a separate wire 17 is either carried to the ground or to some suitable grounding connection so as to quite positively eliminate all fire hazard since this wire will transmit current from the box assembly which might otherwise arc at the pipe and box connection and the old conduit and box are therefore not relied upon to carry away the short circuit ground current. This wire 17 is attached to the grounding connecter by mounting a wire clamp and lock nut 18 on the screw 15. After the screw 15 is tightened sufficiently against the bushing nut 9, the ground wire connection 17 may be completed by running the nut 18 down against the wire 17 or against its terminal piece which attaches the wire to the wedging and grounding connecter and locks the screw 15 against loosening.

What is claimed is:

1. In combination with a conduit and box assembly including lock and anchorage nuts to fasten the pipe in an opening in the box wall, of a grounding connecter comprising a U-shaped member including legs spaced apart and straddling the pipe, and placed inside the box between one nut and the box wall, the legs being wedge-shaped and reduced in thickness away from their ends, a screw which is threaded through the member and disposed substantially parallel to the legs and which is located at the thinnest ends of the legs, and the screw bearing against the last named nut and reacting therefrom to enforce sliding movement of the wedge legs against the box and nut.

2. A grounding connecter comprising a U-shaped member including parallel legs, an ear carried by the member centrally between the legs and substantially at right angles thereto, the legs increasing in thickness from the ear outwardly toward their ends and hence wedge shaped, and a screw threaded through the ear.

3. A grounding connecter comprising a yoke having outstanding parallel wedges, the yoke including an ear and means integrally joining the wedges, the ear being located at the thinnest portion of the wedges and substantially at right angles thereto, and a screw threaded through the ear centrally of the wedges.

4. In combination with a conduit and a box having a box hole in a wall thereof, anchorage means to secure the conduit in the box hole, a grounding connecter disposed between the box wall and the anchorage means, operating means reacting between the anchorage means and the grounding connecter to enforce movement of the grounding connecter transversely of the conduit, and means upon the grounding connecter to bear with increasing friction against the box wall and anchorage means upon transverse movement thereof.

5. In combination with a conduit and a box having a box hole in a wall thereof, the end of the conduit being threaded, at least one anchorage nut threaded upon the conduit end to anchor the conduit in the box hole, a grounding connecter disposed between the box wall and the anchorage means, operating means reacting between the anchorage means and the grounding connecter to enforce movement of the grounding connecter transversely of the conduit, and means upon the grounding connecter to bear with increasing friction against the box wall and anchorage nut upon transverse movement thereof.

6. A grounding connecter comprising a member having a pair of spaced wedge-shaped legs, and a screw threaded through the member and placed parallel to and equidistantly spaced between the legs.

7. A grounding connecter comprising a pair of spaced members having wedging surfaces thereupon in the same plane, and operating means carried by the members and spaced from the plane of the members, the operating means directing its force substantially parallel with the plane of the wedging surfaces.

In testimony whereof I affix my signature.
ADNAH McMURTRIE.